Figure 1:
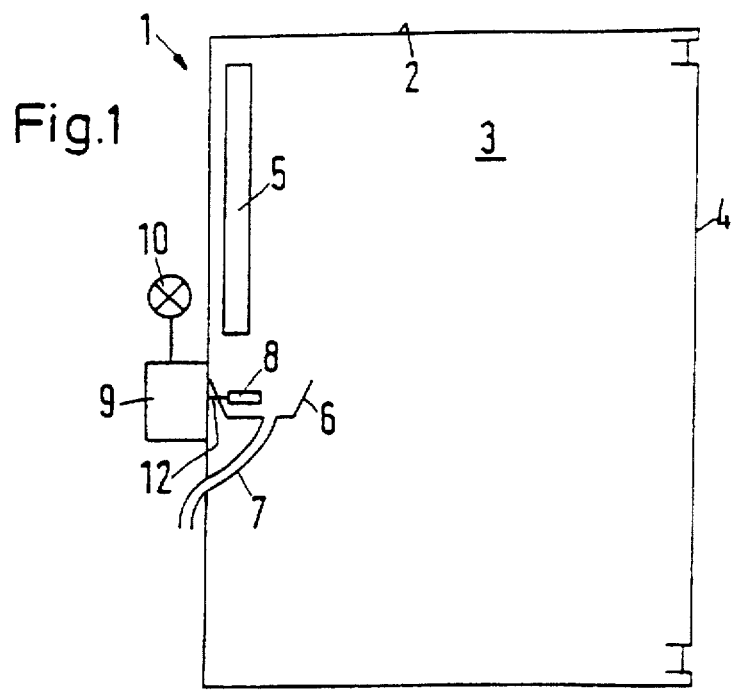

United States Patent [19]
Basse et al.

[11] Patent Number: 5,729,990
[45] Date of Patent: Mar. 24, 1998

[54] REFRIGERATION SYSTEM

[75] Inventors: Tage Stenberg Basse, Nordberg; Vladimir Decovski, Sønderborg, both of Denmark

[73] Assignee: Danfoss A/S, Nordborg, Denmark

[21] Appl. No.: 737,617
[22] PCT Filed: May 17, 1995
[86] PCT No.: PCT/DK95/00193
  § 371 Date: Nov. 6, 1996
  § 102(e) Date: Nov. 6, 1996
[87] PCT Pub. No.: WO95/33168
  PCT Pub. Date: Dec. 7, 1995

[30] Foreign Application Priority Data
  May 26, 1994 [DE] Germany ............... 44 18 313.5
[51] Int. Cl.$^6$ ................................................. F25D 21/02
[52] U.S. Cl. ................... 62/128; 62/129; 62/289; 340/622
[58] Field of Search ............... 62/130, 125, 126, 62/128, 129, 285, 288, 289; 340/608, 616, 618, 622

[56] References Cited

U.S. PATENT DOCUMENTS

| | | | |
|---|---|---|---|
| 4,037,427 | 7/1977 | Kramer | 62/128 |
| 4,633,673 | 1/1987 | Morrison et al. | 62/129 |
| 4,787,212 | 11/1988 | Hessey | 62/128 X |
| 4,937,559 | 6/1990 | Meacham et al. | 340/618 |

*Primary Examiner*—Harry B. Tanner
*Attorney, Agent, or Firm*—Lee, Mann, Smith, McWilliams, Sweeney & Ohlson

[57] ABSTRACT

A refrigeration system having at least one defrostable cold-production device is disclosed, beneath which device a drip tray provided with a drain channel is arranged. In such a refrigeration system, it is desirable to reduce the risk of flooding because of a blocked drain channel. For that purpose, a liquid sensor which detects the presence of liquid at a level above the drain channel is provided in the drip tray.

14 Claims, 1 Drawing Sheet

REFRIGERATION SYSTEM

The invention relates to a refrigeration system having at least one defrostable cold-production device, beneath which device a drip tray provided with a drain channel is arranged.

Such a refrigeration system is known from EP 0 291 381. The drip tray is especially important in refrigeration systems which are repeatedly defrosted either periodically or in dependence on their load. The water draining off during defrosting is caught in the drip tray and discharged through the drain channel. The main application of such refrigeration systems is in refrigeration appliances, for example, refrigerators, upright freezers, chilled display cabinets or counters, and chest freezers. Such refrigeration appliances are in particular affected by the problem that the drain channel becomes blocked, for example, by food particles, bits of packaging, dust or other foreign bodies. In that case, the water is unable to drain out of the drip tray or is not able to drain out quickly enough. Sooner or later the drip tray will then overflow. Since in most cases the amount of water from defrosting is greater than the capacity of the drip tray, this leads to flooding in the refrigeration appliance, to the detriment of the products stored therein.

The drain channel therefore has to be periodically cleaned. For that purpose, in refrigerators which are closed by a door (EP 0 156 229 A2), it is known to construct the drain channel in the manner of a nozzle, that is, to give it a conical construction which converges towards a wall in such a manner that a passage of reduced cross-sectional area is created. As the door of the refrigerator is opened, a current of air is sucked through the nozzle-like opening and clears the opening of dirt and dust. This solution is not applicable, however, to larger refrigeration systems, chest freezers or similar appliances. As a rule, a door is not opened and closed here.

The invention is based on the problem of reducing the risk of flooding during defrosting.

This problem is solved in a refrigeration system of the kind mentioned in the introduction in that a liquid sensor which detects the presence of liquid at a level above the drain channel is provided in the drip tray.

When the drain channel is blocked, liquid that is produced, for example, during defrosting, will collect in the drip tray. As soon as it has reached a level or a depth at which it can be detected by the liquid sensor, the liquid sensor can give a warning signal or interrupt the defrosting. By means of the warning signal, an operator can be made aware that the drain channel is blocked. Normally, only a few manual operations are required to clean the drain channel. The warning signal can comprise, for example, illumination of a lamp.

Although a liquid sensor in a refrigeration system is known from DE 33 26 799 A1, this sensor is arranged in the drain channel itself. It is intended to interrupt the operation of the compressor as long as water is flowing out of the drip tray, that is, during the defrosting process. In this manner, it is intended that the layer of ice or frost on the refrigerating surface is fully defrosted, but the pauses during cold production are not too long. This sensor is completely unsuitable for the problem under consideration, however, because any blockage of the drain channel that may occur would be interpreted by the sensor to mean that defrosting was over and the melted water had drained off, whereas in reality the drip tray is full of water. The risk of flooding cannot be influenced in any way by this.

The liquid sensor is preferably in the form of a heatable temperature sensor. The influence of heating on the temperature is different in air to that in water or ice. Using the temperature, one can therefore determine during or after heating whether there is still water or ice in the drip tray or whether there is only air in the drip tray.

The liquid sensor preferably comprises an electrical resistor. Heating by means of current through an electrical resistor can be regulated relatively well and can be controlled without difficulty under conditions of safety.

It is also preferred for the liquid sensor to be surrounded by a protective guard. It has been shown that the actual ambient temperature has only a very minor influence on the thermal behaviour of the sensor during heating. More critical, however, is the supply or dissipation of heat by passing air. The protective guard prevents the sensor being affected by circulating air. The result is consequently more reliable.

It is especially preferred herein for the protective guard to be in the form of a capsule, the wall of which has openings for the passage or ice and/or water. In this way, on the one hand any appreciable circulation of air avoided, but at the same time the passage of ice and/or water is allowed. The liquid sensor is therefore in fact restricted to monitoring whether air or water or ice is present in the drip tray.

In a preferred embodiment, a control device is provided, which determines the temperature at the liquid sensor at at least two different times and compares the temperatures with one another. In this manner several items of information can be obtained. Firstly, the actual, that is, absolute, temperature rise or temperature drop can be established. Secondly, however, the relative temperature increase or the relative temperature drop can also be ascertained, by relating the temperature difference between the two values to one of the two temperature values. The relative temperature change provides a clear indication as to whether the liquid sensor is surrounded by water or ice or by air. In water and ice, the relative temperature change is greater than in air.

Preferably, the control device has a memory for a first temperature value, a divider for forming a quotient from a second temperature value and the first temperature value, and a comparator, which produces an alarm signal when the quotient exceeds or falls below a predetermined value. Whether that value is exceeded or fallen below is determined by whether the larger or the smaller temperature value is used as the counter. If, for example, the smaller temperature value, which is determined after a certain cooling-down phase, is used as counter, one assumes that the liquid sensor is located in air if the quotient is greater than 0.3. It can be assumed that the sensor is surrounded by liquid if the quotient is 0.04. In order to determine reliable threshold value, 0.1 or 10% can be chosen for example, below which an alarm is set off.

The control device preferably has a timer which initiates a measuring cycle at predetermined intervals. Measurement is therefore effected only from time to time, for example, every 15 minutes.

In that case, the control device preferably also controls the heating of the liquid sensor. The coordination between the heating and the temperature measurement is consequently simplified. In particular, temperature measurements can thus taken in dependence on the duration or the starting and finishing points of the heating.

The resistor preferably has a temperature-dependent resistance value. The control device can thus measure the temperature virtually at the same time as it measures the heating. It is possible here to use either a resistor with a positive temperature dependency or a resistor with a negative temperature dependency (PTC- or NTC-resistor). An electrical heating output of about 0.5 W has proved suitable when using a Pt-100 resistor.

It is preferred for one measurement to be taken in the unheated state and another to be taken at the end of a heating period of predetermined length. Measurement of the temperature in the unheated state therefore provides information about the ambient temperature at the same time, provided that the last heating period has run for a sufficiently long time. The relative temperature change can therefore be related to the ambient temperature, which allows for improved interpretation of data. Measuring the temperature at end of the heating period on the one hand allows information to be obtained about the final temperature resulting from the heating. The final temperature in air is substantially higher than in water or ice, all other conditions being identical. On the other hand, it allows information to be obtained about the rise in temperature.

The heating period preferably lasts for about 3 minutes. Although this time is not sufficient to reach the actual final value which would obtain with a corresponding heating over a longer period, a heating duration of 3 minutes still results in a sufficient increase in temperature to give temperature values that differ sufficiently from one another for them to be evaluated.

Measurement preferably takes place in the unheated state prior to measurement at the end of the heating period. In that case, measurement in the unheated state also provides information about the ambient temperature. Measurement at the end of the heating period then provides information about the temperature rise during the heating. This is substantially quicker in water or ice, but reaches only a smaller final value than in air.

In another preferred embodiment, measurement in the unheated state takes place a predetermined time after the end of the heating period. Here, cooling of the temperature sensor is ascertained. Cooling is also subject to substantially the same laws as heating. Both processes follow substantially an exponential characteristic. Conclusions about the medium that surrounds the liquid sensor can therefore also be drawn from the progression of cooling.

The predetermined time is preferably about 1 minute. Cooling is substantially quicker than heating, so that a shorter time is sufficient for measurements to be taken with the necessary reliability.

In an especially preferred embodiment, three measurements are taken, the middle measurement being taken at the end of the heating period and the other two being taken before and after without heating. With this kind of measurements, additional information is obtained, for example, about the initial temperature, which corresponds in the majority of cases to the ambient temperature. The more information is available, the greater is the meaningfulness and the reliability with which the results are achieved.

Measurements are advantageously taken outside the defrosting period. Outside the defrosting period there should be no liquid in the drip tray. Should liquid nevertheless be present, this indicates that the drain channel is blocked. The warning signal can now be actuated or the next defrosting process can even be delayed until the fault is rectified.

The liquid sensor is advantageously fixedly adhesively secured in the drip tray by a layer of adhesive. The layer of adhesive can be formed, for example, by an adhesive strip. This facilitates fixing. No additional bores or the like require to be provided in the drip tray.

Figure 2:
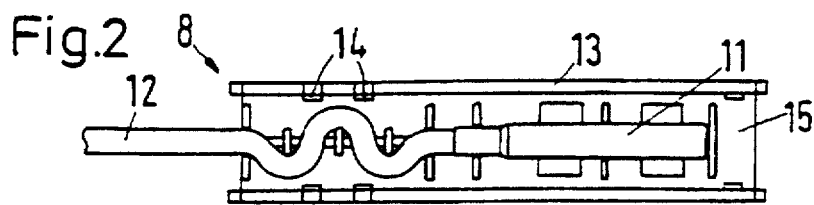
Figure 3:
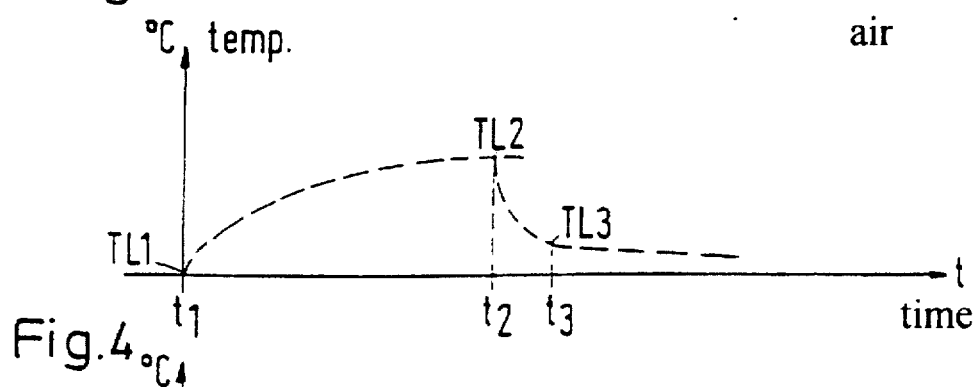
Figure 4:
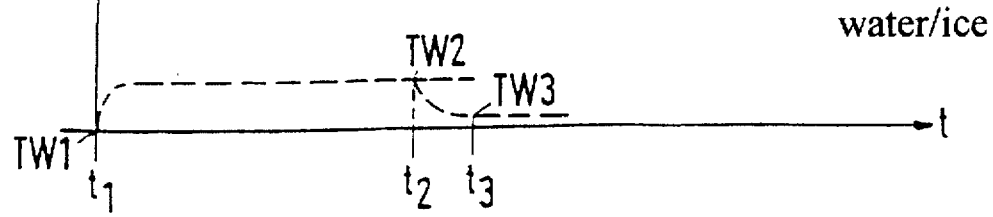

The invention is described hereinafter with reference to a preferred embodiment in conjunction with the drawing, in which FIG. 1 is a diagrammatic view of a refrigeration system,
FIG. 2 is a view of a liquid sensor, partly in section,
FIG. 3 is a temperature curve in air and
FIG. 4 is a temperature curve in water/ice.

A refrigeration system 1, here illustrated as a refrigerator, has; a cabinet 2 which encloses a refrigeration space 3. Access to the refrigeration space 3 is through a door 4.

A cold-production device, for example, an evaporator 5, which in known manner is supplied from a compressor with refrigerant in liquid form, is arranged in the refrigeration space 3. The compressor is not shown.

As is known, during operation a layer of ice or frost forms on the evaporator 5 in the course of time, which hampers the transfer of heat between the evaporator 5 and the refrigeration space 3. The evaporator 5 therefore has to be defrosted periodically.

The water draining off during defrosting of the evaporator 5 is caught in a drip tray 6 and discharged from the refrigeration space 3 through a drain channel 7. It can then, for example, flow into the waste water disposal system or be conveyed to a heated surface of the compressor, where it is able to evaporate again.

Occasionally, the drain channel 7 may become blocked. In that case, the water would not be able to drain out of the drip tray 6. It would collect there and, when a certain amount was exceeded, would overflow and lead to flooding on the floor of the refrigeration space 3.

In order to be able to recognize this danger situation in good time, a liquid sensor 8 fixed in the drip tray 6 by an adhesive strip is provided, the sensor being able to detect liquid in the drip tray 6 at a level above the drain channel 7. The liquid sensor 8 is connected to a control device 9 which actuates a warning device 10 when it establishes, by means of the liquid sensor 8, that liquid, for example, water, has collected in the drip tray 6. The warning device can be, for example, a warning light or an acoustic signalling means, for example, a hooter. The control device 9 can, of course, also be constructed so that it controls a defrosting device, not shown more specifically, for the evaporator 5. Whenever liquid is detected in the drip tray 6, defrosting of the evaporator 5 is at first not initiated at all, rather, simply a warning is given.

The construction of the liquid sensor 8 is illustrated in greater detail in FIG. 2. The main element of the liquid sensor is a Pt-100 resistor 11, which is connected by way of an electrical lead 12 to the control device 9. The resistor 11 is surrounded or encapsulated by a housing 13. However, the housing 13 has openings 14 at its two sides and an opening 15 at its end face. The housing 13 prevents moving air from causing transfer of heat to or from the resistor. The openings 14, 15 nevertheless allow entry of water to the inside of the housing 13. The arrangement of the openings 14, 15 is therefore dependent on the desired position and orientation of the liquid sensor 8 in the drip tray 6.

The resistor 11 has a temperature dependency, that is, its resistance increases as the temperature increases. The control device 9 is therefore able to detect the temperature at the resistor 11 simply by measuring the resistance value.

To determine whether liquid is present in the drip tray 6 or not, the control device 9 supplies the resistor 11 with an electrical heating power of about 0.5 W. Referring to FIGS. 3 and 4, the difference in the temperature gradient between air (FIG. 3) and water or ice (FIG. 4) is clearly apparent. At a time $t_1$ the control device 9 starts to heat the resistor 11. Heating lasts until the time $t_2$. In this particular case this is about 3 minutes. Starting from identical ambient temperatures TL1 for air and TW1 for water, the temperature rises to a value TL2 when the liquid sensor 8 is in air, and to a value TW2 when the liquid sensor 8 is in water or ice. The temperature TL2 in air is here substantially higher than the temperature TW2 in water. The temperature rise initially is much steeper in water than in air. Either the absolute temperature TL2 or TW2, or the temperature difference TL2–TL2 or TW2–TW1, or the relative temperature increase can now be used as the criterion to determine whether the liquid sensor 8 is surrounded by water or by air. If desired, one need not wait for the entire heating period to the time $t_2$. Temperature measurement can alternatively be effected earlier.

At the time $t_2$, heating is stopped. By virtue of the lower temperature in the refrigeration space 3, the resistor 11 cools, namely, with the characteristics illustrated in FIGS. 3 and 4 which correspond substantially to an exponential characteristic. At the time $t_3$, which is about 1 minute after the time $t_2$, a temperature TL3 in air and TW3 in water is reached. The temperature TL3 in air is higher than the temperature TW3 in water. Either the absolute temperature TL3 or TW3 can be used as criterion for whether there is water or air in the drip tray, or the absolute temperature difference can be used, which is greater in air than in water, or the relative temperature difference can be used, that is, the quotient from the absolute temperature difference and the larger or smaller of the two values at the times $t_2$ and $t_3$ respectively. If the relative temperatures are used, one can establish, for example, how high the temperature at the time $t_3$ is in relation to the temperature value at the time $t_2$. In water, the temperature will only be less than 4% of the value TW2. In air, the temperature TL3 is normally greater than 10% of the temperature TL2. This 10% can therefore be taken as the limit value. If the temperature at the time $t_3$ is less than 10% of the value at the time $t_2$, an alarm is set off.

Finally, all three temperatures TL1, TL2 and TL3, and TW1, TW2 and TW3 can be evaluated. The temperatures TL1 and TW1 measured at time $t_1$ here provide information about the ambient temperature, whilst the other temperatures $t_2$ and $t_3$ provide information about the temperature development, which in its turn again allows conclusions to be drawn about the environment around the liquid sensor 8.

Measurement is preferably effected outside the defrosting periods. Whenever liquid is then detected in the drip tray 6, further defrosting processes can for the time being cease until the blockage in the drain channel 7 has been eliminated.

The control circuit also contains a timer, for example a clock, so that measurement can be effected repeatedly every 15 minutes. Other intervals can be selected.

On the one hand this saves energy, but on the other hand also prevents unnecessary heating of the refrigeration space. It is impossible to exclude, of course, that liquid will collect in the drip tray within the interval. But it is highly likely that the fault will be noticed in good time during a measurement outside the intervals.

We claim:

1. A refrigerating system having at least one defrostable cold-production device, beneath which device a drip tray provided with a drain channel is arranged, in which tray a temperature dependent resistor is located as a liquid sensor, electric power being provided to said resistor to heat it and means being provided for determining a change in resistance value of the temperature dependent resistor in dependence on defrost water level in the drip tray, and including a control device having means to determine the temperature at the liquid sensor at at least two different times and to compare the temperatures with one another.

2. A refrigeration system according to claim 1, in which the liquid sensor is surrounded by a protective guard.

3. A refrigeration system according to claim 2, in which the protective guard is in the form of a capsule having a wall which has openings for the passage of ice and/or water.

4. A refrigeration system according to claim 1, in which the control device has a memory for a first temperature value, a divider for forming a quotient from a second temperature value and the first temperature value, and a comparator, which produces an alarm signal when the quotient exceeds or falls below a predetermined value.

5. A refrigeration system according to claim 1, in which the control device includes a timer which initiates a measuring cycle at predetermined intervals.

6. A refrigeration system according to claim 1, in which the control device also includes means to control the heating of the liquid sensor.

7. A refrigeration system according to claim 1, in which the means to determine takes one measurement in an unheated state and another measurement at the end of a heating period of predetermined length.

8. A refrigeration system according to claim 7, in which the heating period lasts for about 3 minutes.

9. A refrigeration system according to claim 7, in which measurement takes place in the unheated state prior to measurement at the end of the heating period.

10. A refrigeration system according to claim 7, in which measurement in the unheated state takes place a predetermined time after the end of the heating period.

11. A refrigeration system according to claim 10, in which the predetermined time is about 1 minute.

12. A refrigeration system according to claim 7, in which three measurements are taken, a middle measurement being taken at the end of the heating period and the other two measurements being taken before and after without heating.

13. A refrigeration system according to claim 1, in which measurements are taken outside a defrosting period for the cold-production device.

14. A refrigeration system according to claim 1, in which the liquid sensor is fixedly adhesively secured in the drip tray by a layer of adhesive.

* * * * *